US006754322B1

(12) United States Patent
Bushnell

(10) Patent No.: US 6,754,322 B1
(45) Date of Patent: Jun. 22, 2004

(54) CALL ME CONFERENCE CALL SYSTEM

(76) Inventor: William Jackson Bushnell, 1220 S. 6th St., St. Charles, IL (US) 60174

( * ) Notice: Subject to any disclaimer, the term of this patent is extended or adjusted under 35 U.S.C. 154(b) by 0 days.

(21) Appl. No.: 09/386,729

(22) Filed: Aug. 31, 1999

(51) Int. Cl.[7] ................................................. H04M 3/42
(52) U.S. Cl. .............. 379/202.01; 379/158; 379/205.01
(58) Field of Search ........................... 379/88.11, 88.18, 379/93.17, 93.21, 93.23, 202.01, 203.01, 206.01, 221.09, 265.09, 158, 205.01

(56) References Cited

U.S. PATENT DOCUMENTS

| | | | | |
|---|---|---|---|---|
| 3,144,518 | A | * 8/1964 | Lummis ................. | 379/204.01 |
| 4,577,065 | A | * 3/1986 | Frey et al. ............. | 379/204.01 |
| 4,635,251 | A | * 1/1987 | Stanley et al. ............... | 370/261 |
| 5,425,091 | A | * 6/1995 | Josephs ................. | 379/209.01 |
| 5,475,747 | A | 12/1995 | Bales et al. .................. | 379/201 |
| 5,483,588 | A | * 1/1996 | Eaton et al. ........... | 379/202.01 |
| 5,495,522 | A | * 2/1996 | Allen et al. ............ | 379/202.01 |
| 5,812,652 | A | * 9/1998 | Jodoin et al. .......... | 379/205.01 |
| 5,844,973 | A | * 12/1998 | Venkatraman et al. . | 379/127.05 |
| 5,903,629 | A | * 5/1999 | Campbell, IV et al. .. | 379/88.24 |
| 5,978,463 | A | * 11/1999 | Jurkevics et al. ...... | 379/202.01 |
| 6,236,644 | B1 | * 5/2001 | Shuman et al. ............. | 370/261 |
| 6,304,648 | B1 | * 10/2001 | Chang .................... | 379/202.01 |
| 6,330,320 | B1 | * 12/2001 | Cornell et al. ......... | 379/202.01 |
| 6,411,605 | B1 | * 6/2002 | Vance et al. ................. | 370/261 |
| 6,463,038 | B1 | * 10/2002 | Wilson ........................ | 370/261 |

FOREIGN PATENT DOCUMENTS

EP        0 604 046 A1    3/1993
WO       WO 98/53591     11/1998

OTHER PUBLICATIONS

Haszto, E. D.; Weber, N. C.; "Alliance Teleconferencing Services Boost Business Efficiency" AT&T Technology, American Telephone & Telegraph Co., Short Hills, New Jersey, vol. 3, No. 1, 1988, pp. 22–31, ISSN: 0889–8979.

European Patent Office, Search Report for corresponding EP application, No. EP 00307186, Oct. 1, 2001.

* cited by examiner

Primary Examiner—Bing Bui

(57) ABSTRACT

A "Call Me" conference call system includes a multiport conference unit (MCU) interconnected with the public switched telecommunications network (PSTN), a telecommunications switching system also interconnected with the PSTN, a service control point (SCP) or other intelligent network control component having at least a signaling connection to the switching system, a Call Me conference bridge reservation system interconnected with the SCP and the MCU, and suitable facilities interconnecting these components. When a conference reservation is made, information regarding the conference is distributed to the SCP and MCU. A "Called Party Busy" trigger is applied to the conference host's line. To join the conference, the host and participants alike simply call the host's telephone number. The switching system, finding the host's line busy, queries the SCP, which instructs it to redirect the call to the MCU. The MCU associates the call with a reserved conference by matching the called number with a host's telephone number in reservation records. This advantageously avoids the need for hosts to distribute, and participants to receive a special conference bridge telephone number or access code.

2 Claims, 4 Drawing Sheets

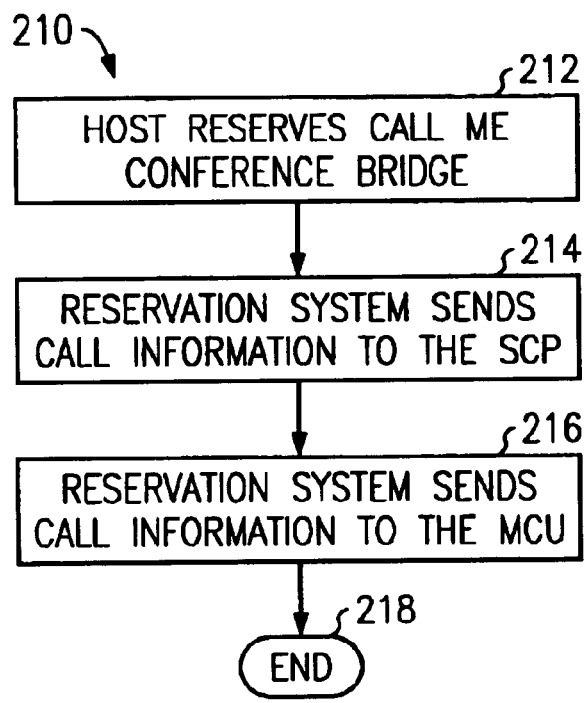
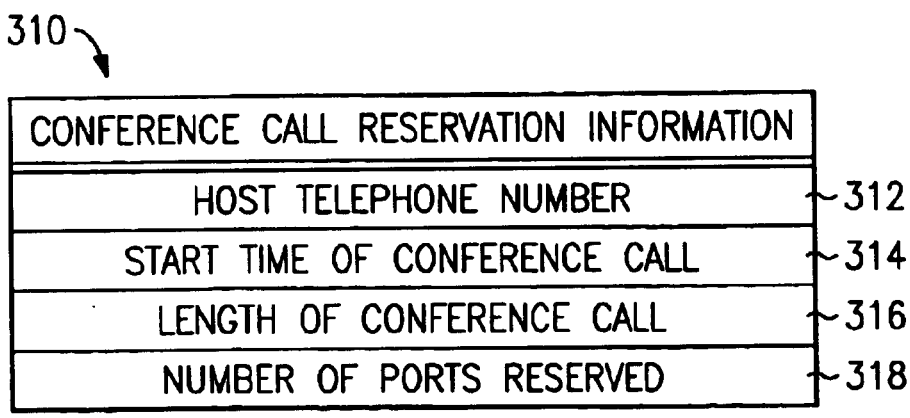

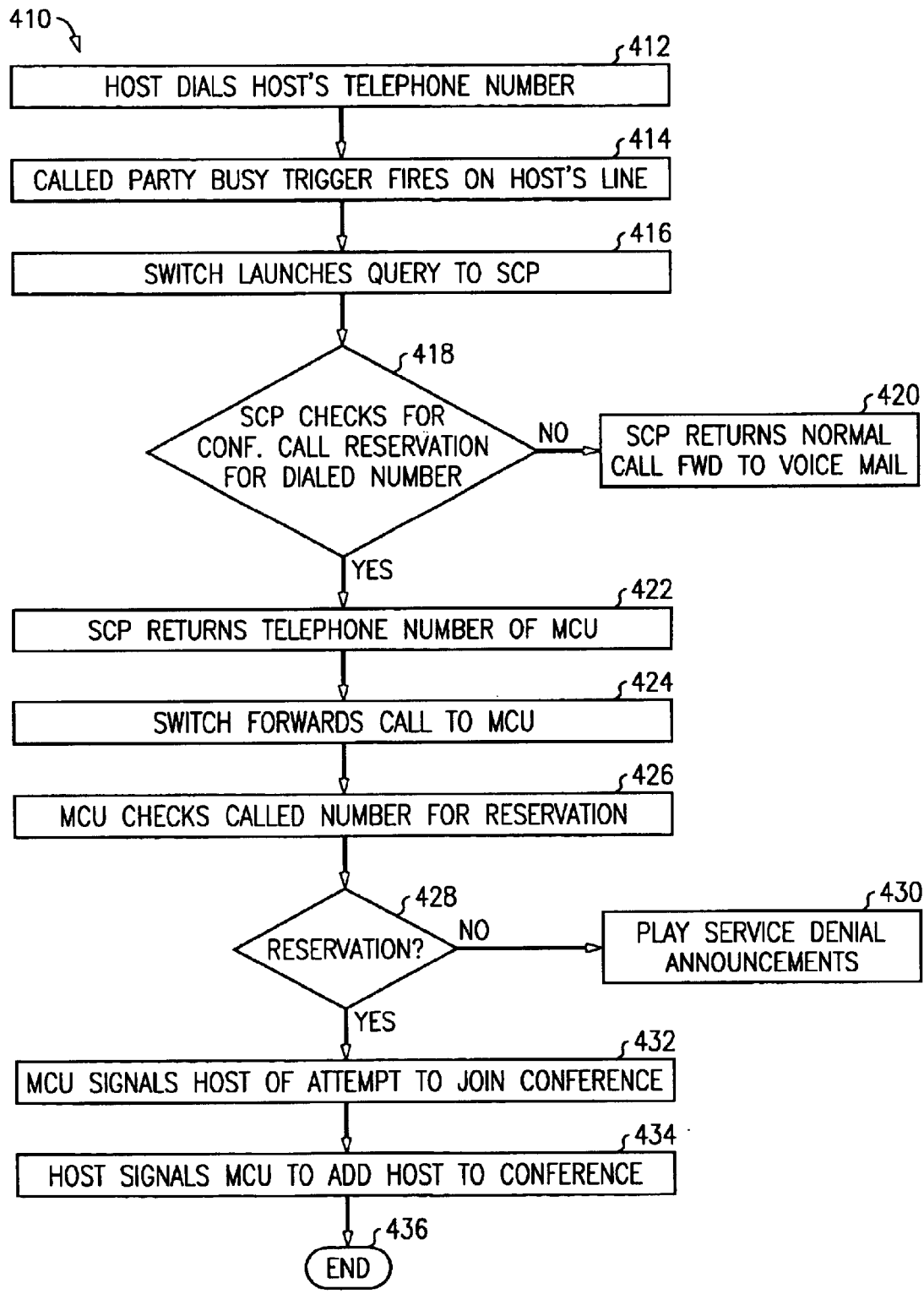

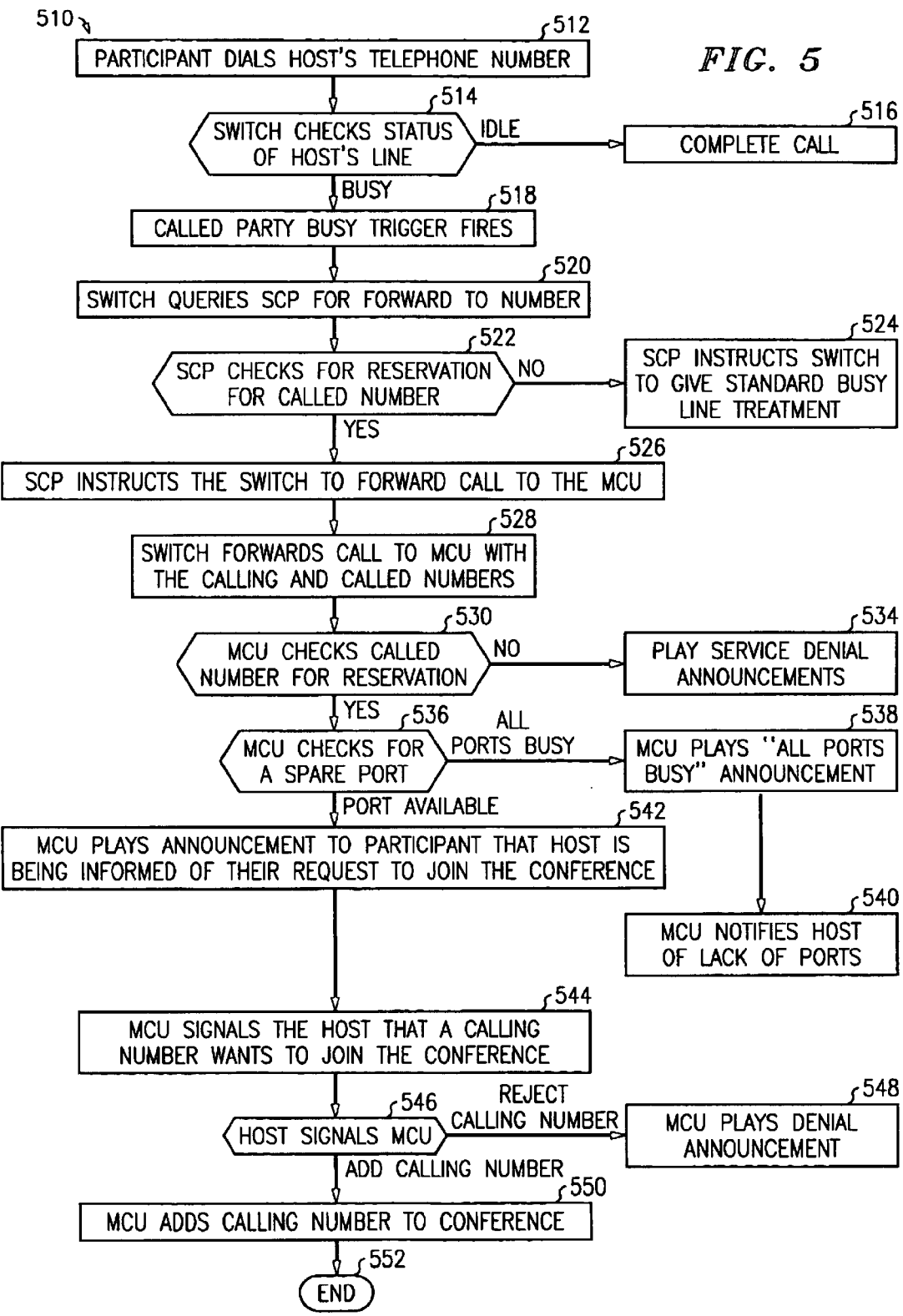

CALL ME CONFERENCE CALL SYSTEM

FIELD OF THE INVENTION

This invention relates to telecommunications system and services, and more particularly to systems and methods for establishing conference calls among several participants.

BACKGROUND OF THE INVENTION

A "conference call" is a known feature provided by a telecommunications system in which a telephone connection is established for simultaneous communications among more than two parties. A significant benefit provided by a conference call is allowing the parties to meet without traveling to the same location. Thus, conference calls are frequently used for project or team meetings, and in other applications in which people at disparate locations wish to meet by telephone. Conference calls are typically set up in one of two known arrangements: Host Originated conferencing, and "Meet Me" conferencing.

With Host Originated conferencing, the host, at the prescribed time for the conference call, activates a conference feature on their local end-office switch or PBX and dials each of the participants. In order for the conference to be successful in joining all intended participants, each participant must be at their designated location at the time of the call, and each participant must answer the call. A problem with Host Originated conferencing is that often the participants are busy on another call, or are away from their desks at the start of the call, and therefore one or more intended participants cannot be joined to the call.

With Meet Me conferencing, a dial-in telephone number is assigned to a conference bridge and published in advance to intended participants. An advantage of Meet Me conferencing is that it allows each participant to dial into the bridge from any location. Furthermore, if a participant is late, they can still dial into the bridge and be added to the call.

Currently-available systems providing Meet Me conference call capabilities employ user-originated processes which are cumbersome, time consuming and error prone. For example, to reserve conference call facilities, the Meet Me conference call host contacts a conference bridge reservation agent and reserves a conference bridge at a predefined time. If facilities are available, the reservation agent informs the host of the telephone number for the conference bridge and the access code assigned to the call. Even for conference calls scheduled repetitively (e.g., weekly or monthly calls at similar times), the conference bridge telephone number may change, and the access code typically changes. The conference call host must then contact each participant in advance and relay the telephone number for the bridge and the access code.

In order to participate in the Meet Me conference call, each participant must dial the telephone number for the conference bridge. The conference bridge equipment then prompts the participant to enter the access code. If the access code is valid the participant is added to the conference call. In large organizations, this scenario is played out hundreds of times per week, and often there are problems which prevent an intended participant from gaining timely access to the conference call. Examples of such problems include:

(1) The participant misplaces or does not receive the conference bridge and access code information;

(2) The participant receives incorrect information (in some cases, erroneous information is transmitted to all participants by the host); and (3) The participant dials the wrong conference bridge or enters the wrong access code and joins a conference call other than the intended one.

Thus, there is need for an improved conference call system which simplifies and makes more reliable the processes of establishing a conference call by a conference call host and accessing a conference call by an intended participant.

OBJECTS AND SUMMARY OF THE INVENTION

It is therefore an object of the present invention to provide a conference call system and methods for use in conjunction therewith which minimize the disadvantages of prior art conference call systems.

According to an aspect of the invention, a "Call Me" conference call service is implemented in conjunction with conference bridge, conference reservation, telecommunications switching, and control facilities. Persons wishing to participate in the conference place a call to the telephone number normally assigned to the telephone (or line) of the conference call host. When a call destined for the host's line arrives at the telecommunications switching office serving the host, and a previously reserved conference call is active, the telecommunications switching office automatically redirects the call to the conference bridge facilities. The caller is informed by announcement that the host is on a conference call and then invited to join the conference.

A preferred embodiment of a "Call Me" conference call system constructed according to the present invention comprises a multiport conference unit (MCU) interconnected with the public switched telecommunications network (PSTN), a telecommunications switching system also interconnected with the PSTN, a service control point (SCP) or other intelligent network control component having at least a signaling connection to the switching system, a Call Me conference bridge reservation system interconnected with the SCP and the MCU, and suitable facilities interconnecting these components.

According to an aspect of the invention, methods are provided for use in conjunction with the switching system, the conference bridge reservation system, the SCP, and the MCU, to implement a Call Me conference call (CMCC) service.

In operation, the person who is to host the CMCC registers the call in advance with a Call Me conference bridge reservation system. The CMCC host identifies the host's directory number, the starting time of the CMCC, the length or ending time of the CMCC, and the number of conference bridge ports to be reserved. Also, a subscription is required for each person who will host a CMCC conference. When a customer subscribes to the CMCC service, the service provider establishes a "Called Party Busy" intelligent network trigger for the subscriber's telephone line. The trigger enables telephone switching system serving the conference host's line to seek additional call handling instructions when a call arrives while the host's line is busy.

When a call to the CMCC host's telephone number, such as a call from a person desiring to participate in a conference call, arrives at the telecommunications switching system serving the host's line and the host's line is busy, the switching system determines that the intelligent network trigger is active and launches a database query to the SCP to determine where to redirect the call. The SCP verifies that a conference call is active, and if so, returns to the switching system the telephone number of the MCU. The switching system then automatically redirects the call to the MCU. The MCU greets the caller with an announcement indicating that the called party is currently hosting a conference call and inviting the caller to join the conference or elect other call treatment options, such as redirecting the call to an attendant or a voice mail system.

If the caller elects to join the conference, the MCU alerts the host that a caller has requested to join the conference and awaits the host's approval. The alert may include caller identification information such as the calling number or the caller's name. The alert message to the host may be delivered in several ways. For example, the alert message may be delivered as a barge in announcement that only the host hears, through a message displayed on a conventional caller-ID display unit, through a message displayed on an ISDN telephone, or through a message shown on a pop up window on an H.323 voice-over-IP terminal. The host may then instruct the conference bridge to add the call to the bridge or to apply other treatment to the call, such as redirecting the call to an attendant or a voice mail system. The host may signal the conference bridge by, inter alia, entering touch-tone digits, depressing an ISDN feature button, or sending a TCP/IP message.

A Call Me conference bridge system constructed according to the present invention advantageously eliminates the need to send participants either the telephone number of the conference bridge or a conference bridge access code. Instead, the host of the conference need only instruct all other participants to call the host's own telephone number at a prescribed time. Also advantageously, the conference call host is notified as each participant joins the conference call. Consequently, the host knows if all the participants have joined the call. This is an improvement over known "Meet Me" style conference call services, wherein the participants must identify themselves as they join the bridge, or the host must challenge each participant to disclose their identify. If a participant joins a "Meet Me" style conference call late, this identification process interrupts the business of the conference call. Advantageously, in an embodiment constructed according to the present invention, late-arriving participants may be joined silently, or may be introduced at a natural break in the business of the call.

BRIEF DESCRIPTION OF THE DRAWINGS

These and other features of the invention will be best understood by reference to the following detailed description of a preferred embodiment of the invention, taken in conjunction with the accompanying drawings, in which:

FIG. 2 is a flow diagram showing a method for use in conjunction with the CMCC of FIG. 1 for establishing a registration for a conference call;

FIG. 3 is a diagram showing a reservation record data structure for use in conjunction with the CMCC of FIG. 1 in establishing a reservation for a conference call;

FIG. 4 is a flow diagram showing a method for use in conjunction with the CMCC of FIG. 1 for initiating a previously-reserved conference at the request of the conference host; and FIG. 5 is a flow diagram showing a method for use in conjunction with the CMCC of FIG. 1 for handling a call from a participant to a conference host's line or telephone, including adding the participant to an ongoing conference.

DETAILED DESCRIPTION OF THE PREFERRED EMBODIMENTS

Figure 1:
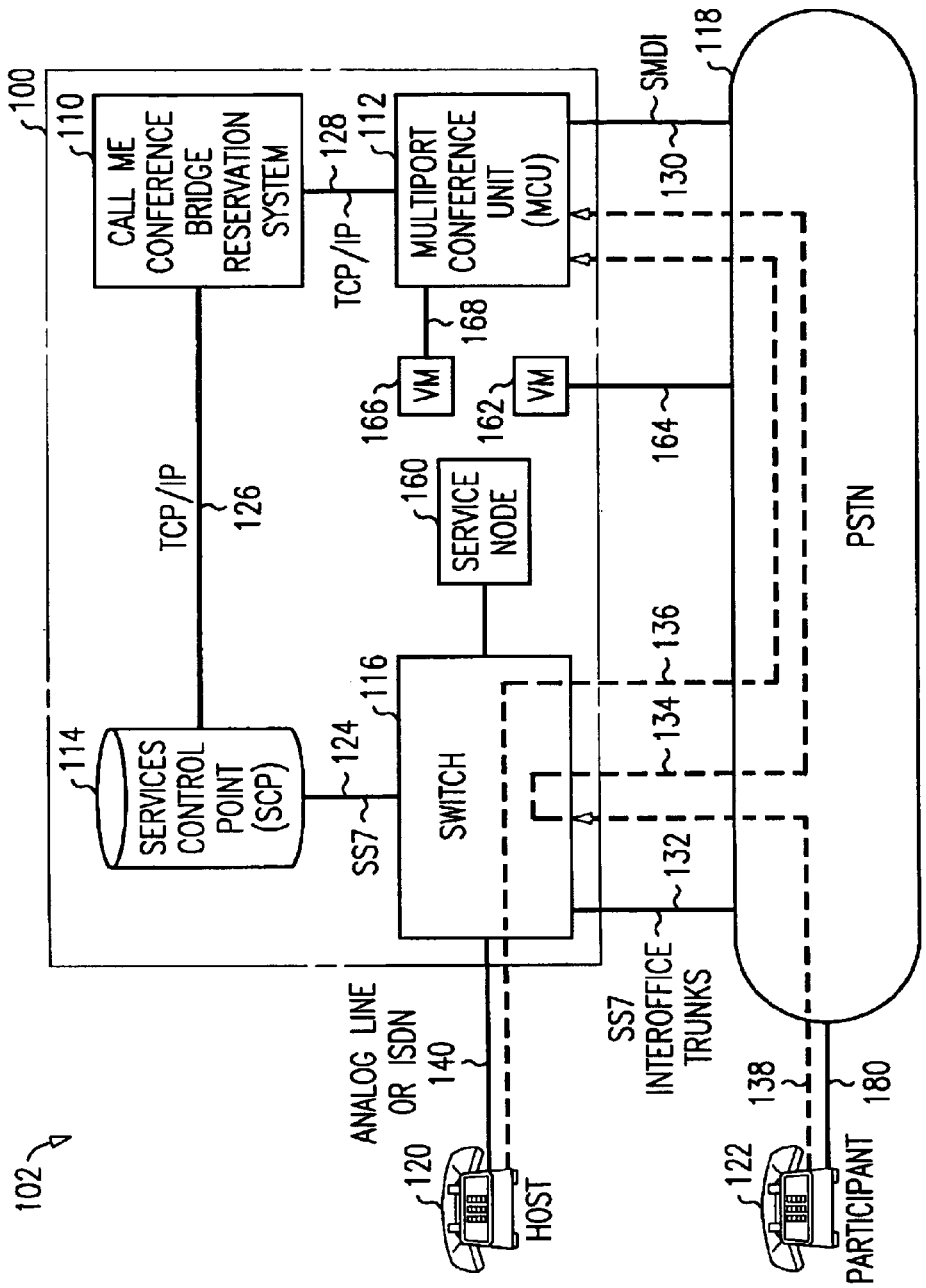
FIG. 1 is block diagram showing the arrangement of a preferred embodiment of a "Call Me" conference call (CMCC) system constructed according to the present invention.

FIG. 1 is a block diagram of a telecommunications network 102 equipped with a preferred embodiment 100 of a Call-Me Conference Calling (CMCC) system constructed according to the present invention.

The present application relates to telecommunications systems, which may be implemented using a variety of electronic and optical technologies, including but not limited to: analog electronic systems; digital electronic systems; microprocessors and other processing elements; and software and other embodied collections of steps, instructions, and the like, for implementing methods, processes, or policies in conjunction with such systems and processing elements. The embodiments described herein are exemplary. Thus it will be appreciated that although the embodiments are described in terms of specific technologies, other equivalent technologies could be used to implement systems in keeping with the spirit of the present invention. Moreover, it will be appreciated that in the telecommunications arts, various signal leads, busses, data paths, data structures, channels, buffers, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

As best seen in FIG. 1, a preferred embodiment 100 of a Call-Me Conference Call (CMCC) system constructed according to the present invention operates in the context of a telecommunications network. The CMCC system 100 comprises a Call-Me conference bridge reservation system (CBRS) 110, a multi-port conference unit (MCU) 112, an Advanced Intelligent Network (AIN) Services Control Point (SCP) 114, a telecommunications switching system 116, and suitable facilities (e.g., facilities 124, 126, 128, 130, 132) to interconnect these components among themselves and to other portions of the Public Switched Telephone Network 118 (or another suitable network). An optional Service Node 160 may be connected to switch 116 to provide advanced user interaction services. An optional voice mail system 162 may be connected to the PSTN 118 via facilities 164. Another optional voice mail system 166 may be a part of or an adjunct to MCU 112, communicating via facilities 168.

In summary, the CBRS 110 receives registration requests from conference hosts and distributes relevant information regarding such registrations to SCP 114 and MCU 112. MCU 112 receives calls (or call legs) from switch 116 via PSTN 118 and performs a bridging function, combining the signals from a plurality of calls or call legs to allow many participants to communicate. Responsive to conference registration information provided by CBRS 110, SCP 114 informs switching system 116 when calls to the conference host should be redirected to the MCU 112, and identifies a telephone number terminating at the MCU to which such calls should be directed. Switching system 116 receives calls directed to the conference host and if a conference is active, redirects such calls to MCU 112. Thus, in operation, all conference participants signal their intention to join a reserved CMCC conference by originating a call to the conference host, switching system 116 redirects those calls to MCU 112, and MCU 112 bridges the call.

Although in FIG. 1, each of the primary components CBRS 110, MCU 112, SCP 114, and switching system 116 are shown outside the bubble denoting the PSTN 118, this depiction is solely intended to aid the reader by isolating in box 100 those components which directly support the operation of the CMCC system. It will be appreciated that any or all of the components could be operating as elements of the PSTN 118, but could also be elements of a cooperative private network.

Telecommunications switching system (or switch) 116 may be any suitable switching system adapted for communications with a host telephone 120, an SCP 114, and the PSTN 118, and is preferably a stored-program controlled electronic switching system. For example, switch 116 may be implemented using a 5ESS® electronic switching system, which is commercially available from Lucent Technologies, Murray Hill, N.J. Other appropriate switching systems could also be used. Although an exemplary embodiment of the present invention is described in the context of telecommunications networks employing discrete communications circuits and switching facilities which follow the "circuit-switched" model, one of skill in the art will appreciate how to modify the exemplary embodiment to provide the functions described herein in other environments, such as telecommunications networks following packet transmission, routing, and switching models, without departing from the spirit of the invention.

As best seen in FIG. 1, the conference host's telephone 120 is connected to switch 116 via any suitable interconnection facility. The role of switch 116 in the CMCC system 100 is to receive calls directed to the conference host's telephone or telephone line, and if a conference is active, redirect such calls to MCU 112. Because the CMCC service requires that the switch providing the service have information regarding the busy/idle status of the conference host's line, switch 116 is preferably the "terminating end office" with respect to the conference host's telephone 120—that is, it is the public network switch to which telephone 120 is "connected" or to which calls directed to the host's telephone station, line, or number are normally routed. However, the role of switch 116 could also be performed by a switch that is not the terminating end office for telephone 120, such as a tandem or toll switch in the public network, or a private branch exchange (PBX) in a private network, but only if that switch could determine the status of the conference host's line. It is believed that current interoffice signaling systems do not directly provide a mechanism for a switch to obtain the status of a line that terminates on a different switch, but one of skill in the art would appreciate how signaling systems and switch operating software could be modified to provide such information.

Host telephone 120 may be any suitable telephone or other communication device, including, for example, an H.323 endpoint. In the simplest case, host telephone 120 is an ordinary analog telephone or a digital ISDN telephone, switch 116 is the terminating end office, and the interconnection 140 between host telephone 120 and switch 116 may take be implemented as a suitable analog or digital local loop. However, the interconnection 140 may also incorporate T-carrier or other carrier facilities, gateways, multiplexers, and other suitable access facilities, as is known in the art.

As best seen in FIG. 1, switch 116 is preferably connected to the PSTN 118 via any suitable facilities 132. Facilities 132 may, for example, be implemented as a plurality of trunk circuits (whether discrete or carrier-type) controlled according to a known common-channel interoffice signaling system, such as ITU-T Signaling System No. 7 (or any other appropriate signaling format), or line circuits, and may be carried via wire, optical fiber, or any other suitable transmission media. MCU 112 is preferably connected to the PSTN 118 via any suitable facilities 130, including any of those mentioned above as candidates for implementing facilities 132. For example, facilities 130 may be implemented as a plurality of line circuits operating under the Simplified Message Desk Interface (SMDI) protocol. Switch 116 receives, inter alia, incoming calls to the conference host, including calls from those wishing to participate in a conference, from the PSTN via facilities 132.

As best seen in FIG. 1, when an incoming call to the conference host (represented by broken line 138) is to be connected to the MCU 112, which performs the actual bridging of multiple calls or call legs, switch 116 preferably redirects or extends the call (represented by broken line 134) to the MCU 112 via the PSTN 118 and facilities 132, 130. Also, when a conference host initiates the conference call by calling the hosts own telephone number, switch 116 preferably redirects or extends the call (represented by broken line 136), to the MCU 112 via the PSTN 118. This arrangement is believed to be preferable in that an MCU 112 may conveniently be placed at any desired location which is reachable via the PSTN. However, switch 116 could also be interconnected with MCU via any suitable private facilities.

CBRS 110 is a reservation system which may be implemented using a suitable general-purpose computing facility with appropriate interfaces to elements of the public network to accommodate user interaction, and appropriate interfaces to the MCU 112 and SCP 114 to provide interchange of reservation information. As best seen in FIG. 1, CBRS 110 is connected to SCP 114 via link 126, and to MCU 112 via link 128. Links 126 and 128 may be implemented as any suitable data connection between the components. For example, links 126 and 128 may be implemented as a TCP/IP data connection carried over a T-carrier circuit. However, these links could also be implemented using other data communications technologies and protocols, including x.25, HDLC, ATM, or the like, and could be carried over any suitable media, including optical fiber, leased-line type data circuits, wireless links, etc. The design of conference bridge reservation systems having conventional capabilities is known in the art and several conference bridge reservations systems are commercially available. A commercially available CBRS could be used to implement a CBRS 110 of the present invention by modifying it to incorporate, in addition to its conventional functions, a method for distributing reservation information to the SCP and MCU as described further in greater detail.

The CBRS preferably cooperates with switch 116 or other network elements to receive registration request transactions from users or agents. CBRS 110 may directly interact with users or registration agents to receive and respond to reservation requests, in which case a connection (not shown) to a user/agent terminal must be provided. For example, the CBRS 110 could have a line or trunk connection to the PSTN 118 and could be assigned a telephone number which conference hosts would call directly to make registration arrangements. The CBRS 110 would require suitable signal processing equipment to receive touch-tone (or equivalent) in-band signaling or user voice requests, and provide appropriate prompts and responses. The CBRS 110 could also be connected via TCP/IP to the Internet and could provide a world-wide-web based interface to permit users to enter conference registration transactions via an Internet-connected computer and web browser. Alternatively, the CBRS 110 could make use of network resources external to the CBRS to interact with a user to obtain reservation information. For example, SCP 114 and switch 116 could cooperate to perform a reservation transaction, wherein the switch 116 collects digits and plays announcements and prompts, and the SCP relays the collected transaction information to the CBRS 110. Similar functions are available using an optional Service Node 160, a known component of the Intelligent Network having digit collection, announcement, service logic, and other processing capabilities. A suitable service node is commercially available from Lucent Technologies, Murray Hill, N.J., under the designation Lucent Technologies Compact Service Node.

MCU 112 is preferably a multiport conference unit, which may generally take the form of known conference units, but preferably incorporates enhancements to implement a method of operation for providing a Call-Me Conference Call service as described further below. Multiport conference units suitable for use as MCU 112 (after modification to incorporate the aforementioned CMCC service methods) are commercially available. As is known in the art, MCU 112 receives calls or call legs over a plurality of facilities 130 and bridges such calls according to user requests, external instructions, or a predefined arrangement. MCU 112 includes general purpose computing/processing capabilities for performing administrative, signaling and other tasks, and suitable digital signal processing capabilities (or other processing facilities) for performing the function of bridging a plurality of calls or call legs. MCU 112 communicates with CBRS 210 via link 128.

SCP 114 communicates with CBRS 110 via link 126 and with switch 116 via link 124. Link 124 may be any suitable data communications path. In a preferred embodiment, link 124 is preferably a common channel signaling link conforming to ITU-T common channel Signaling System No. 7. An SCP is a node in the Intelligent Network which provides adjunct processing and database services to switching systems and other Network elements, particularly for the purpose of providing call processing and subscriber features in addition to those ordinarily provided by the switch. SCP 114 may be implemented using any suitable services control point, incorporating enhancements to implement a method of operation for providing a Call-Me Conference Call service as described further below. A suitable services control point for use in implementing SCP 114 is commercially available from Lucent Technologies Inc., Murray Hill, N.J., under the designation Advantage SCP.

FIG. 2 is a flow diagram showing a method 210 according to an aspect of the present invention for use in conjunction with CBRS 110 of FIG. 1 for establishing a CMCC conference bridge reservation. FIG. 3 is a diagram showing a reservation record data structure 310 for in establishing a reservation for a conference call. As best seen in FIG. 2, the method begins in step 212, in which the host reserves a CMCC conference bridge by interacting with the CBRS 210 or with a reservation service agent. As best seen in FIG. 3, information needed to effect a reservation is the telephone number 312 of the conference host, the start time 314 of the conference call, the length 316 of the conference call, and the number of conference ports to be reserved 318. Conference bridge ports are expensive and in limited supply, and therefore it is necessary to reserve ports in advance to ensure a sufficient number of ports will be available for all intended conference participant. Additional information may be useful for efficient administration of the CMCC system, including, for example, billing information and the organizational affiliation of the conference host.

In step 214, the CBRS 110 transfers information regarding the reservation to SCP 114. At a minimum, the SCP 114 requires the information in fields 312, 314, and 316 to enable it to redirect to the MCU 112 incoming calls to a conference hosts telephone whenever a CMCC conference is active. (When a customer subscribes to the CMCC service, the service provider establishes a "Called Party Busy" intelligent network trigger for the subscriber's telephone line. The trigger remains for the duration of the subscription and enables telephone switching system serving the conference host's line to seek additional call handling instructions when a call arrives while the host's line is busy. When a call arrives on the conference host's line, the switch 116 transmits an inquiry to the SCP 114, and the SCP 114 returns a telephone number of the MCU 112 assigned to service the conference call. The switch accordingly redirects or extends the call to the MCU 112.)

In step 216, the CBRS 110 transfers information regarding the reservation to SCP 112. The MCU 112 requires the information in fields 312, 314, 316, and 318 to enable it to allocate conference unit ports and to provide appropriate treatment to incoming calls. (When an incoming call arrives at MCU 112, the MCU determines the reserved conference with which the call is associated, determines whether the call may be added to the conference, adds the call to the conference or provides other appropriate call treatment.) The method ends in step 218.

The host initiates a reserved CMCC conference by calling the host's own telephone number. FIG. 4 is a flow diagram showing a method 410 in accord with an aspect of the present invention for use in conjunction with the CMCC of FIG. 1 for initiating a previously-reserved conference at the request of the conference host. The method begins in step 412, in which the host dials the host's own telephone number. The switch 116 attempts to complete the call, but determines that the host's line is busy. As noted above, a "Called Party Busy" intelligent network trigger has been established at switch 116 for the conference host's telephone line, as a result of a prior subscription to the CMCC service. In step 414, the trigger "fires"—that is, switch 116 recognizes that the conditions for the trigger are present, with respect to the host's line. The trigger is an instruction to switch 116 that causes it to query the SCP 112 for information as to how to complete the call. In step 416, the switch 116 launches a query to the SCP 112. Any appropriate interface between the switch 116 and the SCP 112 may be used. For example, the switch may send a query over a signaling link in the form of a message conforming to the ITU-T Signaling System No. 7 Transaction Capability Application Part (TCAP) format. Other interfaces and formats could also be used. The query preferably contains the calling number and called number. As is known in the art, the SCP 112 may include one or more databases of forwarding telephone numbers and call treatment policies which may be associated with lines and services. When the SCP 112 receives a query from the switch 116, it uses the policies and associated data to determine the treatment a call should receive, such as a forwarding number, and accordingly returns a response to the switch resolving the query.

In step 418, the SCP 112 queries an internal database to determine if a reservation is present for a CMCC conference call involving the host's telephone number. If there is no reservation, then in step 420 the SCP 112 instructs the switch 116 to apply normal treatment for a call to a busy line, according to the services to which the host subscribes. For example, the SCP 112 may return an instruction to switch 116 to forward the call to a voice mail service, such as a standalone voice mail system 162 (see FIG. 1). A voice mail system 166 (see FIG. 1) could also be provided as a part of or an adjunct to MCU 112. If such a voice mail system 166 is available and the conference host has subscribed to it, SCP 112 may return an instruction to switch 116 to forward the call to the MCU 112. If a conference call reservation is present, and the call is timely, then the method continues in step 422, in which the SCP returns the telephone number of the MCU 112. In step 424, the switch forwards the call to the MCU.

When the call is forwarded to the MCU 112, the MCU receives the called number. In steps 426 and 428, the MCU 112 checks to see if a CMCC conference has been reserved for the called number and if so, whether the current time is close to the time for which the conference was reserved. If the MCU determines that a conference has not been reserved, then in step 430, the MCU plays an appropriate service denial announcement indicating that no CMCC conference has been reserved for the called number at the current time.

If the MCU 112 determines that a CMCC call has been reserved for the current time, then the method continues in step 432, in which the MCU 112 informs the host that a party at the calling number would like to join the conference. In this case, the calling number is the host's own number. The MCU 112 may inform the host by any suitable tone, announcement, display, or message. For example, the MCU could play a voice announcement, or cause the host's ISDN or ASDI telephone to display an appropriate message, or transmit a message to a caller ID display, or transmit a message to the host's computer workstation via an Internet message display protocol. Other ways of informing the host could also be used. In step 434, the host signals the MCU 112 to add the calling number (the host) to the conference. The signaling from the host to the MCU may employ any suitable communication facility available to both. For example, the signaling could employ in-band DTMF signals generated by the host's analog telephone, equivalent ISDN signaling, out of band Q.931 messages, or new TCP/IP messages generated by a telephone or a computer workstation.

The MCU recognizes that the caller is the conference host by associating the calling number identification, provided by switch 116, with information 312 (FIG. 3) identifying the conference host's telephone number in the conference reservation record. Accordingly, the MCU advantageously can allow the host to control access to the conference without requiring the host to enter an assigned reservation number or password. The method ends in step 436.

Parties, other than the conference host, desiring to participate in a CMCC conference request to join the conference by dialing the host's telephone number. FIG. 5 is a flow diagram showing a method 510 according to an aspect of the present invention for use in conjunction with the CMCC of FIG. 1 for handling a call from a participant to a conference host's line or telephone, including adding the participant to an ongoing conference. The method begins in step 512, in which a participant dials the telephone number of the conference host. Participants may use a telephone connected to switch 116. As best seen in FIG. 1, however, participants may originate a call from any telephone having access to the PSTN 118, which routes the call to switch 116.

In step 514, switch 116 checks the status of the host's line to determine whether the line is busy. If the line is not busy, then in step 516, the switch 116 completes the call to the host's line. The participant may remind the host of the conference call. However, if the line is busy, then in step 518, the switch activates the "Called Party Busy" trigger. In step 520, the switch transmits a "Called Party Busy" query to SCP 112. The query contains the called number and the calling number.

In step 522, the SCP 112 queries an internal database to determine if a reservation is present for a CMCC conference call involving the host's telephone number. If there is no reservation, then in step 524 the SCP 112 instructs the switch 116 to apply normal treatment for a call to a busy line, according to the services to which the host subscribes, and may include call-waiting treatment. For example, the SCP 112 may return an instruction to switch 116 to provide call waiting tones to the host, or to forward the call to a standalone voice mail service 162 or a voice mail service 166 integrated with or operating as an adjunct of MCU 112. If a conference call reservation is present, and the call is timely, then the method continues in step 526, in which the SCP instructs the switch to forward the call to the telephone number of the MCU 112.

In step 528, the switch 116 forwards the call to the MCU 112. As part of the call setup message, the switch 116 informs the MCU 112 of the called number and the calling number. In step 530, the MCU 112 analyzes the called number to determine if a CMCC conference is in progress for the called number. If the MCU 112 determines that there is no CMCC conference in progress for the called number, the method jumps to step 524, in which the MCU provides a service denial announcement to the participant. If a voice mail system 166 integrated with or operating as an adjunct to MCU 112 is available and the conference host subscribes, the MCU may direct the call to the voice mail system. However, if the MCU 112 determines that there is a CMCC conference in progress for the called number, the method continues with step 536.

In step 536, the MCU 112 determines whether there is a conference bridge port available to serve the participant's call. If there is not an available port, the method jumps to step 538, in which the MCU notifies the participant via an announcement or call progress tone that no ports are available. In that case, the MCU 112 may redirect the call to a voice mail system 166 if available. In step 540, the MCU further notifies the host via an announcement, call progress tone, telephone display, or computer message that no ports are available to serve a requesting participant. The host may then take appropriate action to request additional conference bridge ports, or request that users on existing ports drop or consolidate their calls.

If, in step 536, the MCU 112 determined that a port was available, the method continues in step 542. In step 542, the MCU 112 provides an announcement to inform the participant that the host is being notified that the participant desires to join the conference.

In step 544, the MCU 112 signals the host that the participant desires to join the conference. Preferably, the MCU provides the host with the information identifying the participant, such as the participant's calling telephone number and name. The MCU 112 may signal the host by any suitable tone, announcement, display, or message. For example, the MCU could play a voice announcement, or cause the host's ISDN or ASDI telephone to display an appropriate message, or transmit a message to a caller ID display, or transmit a message to the host's computer workstation via an Internet message display protocol. Other ways of informing the host could also be used. If the host is notified via out of band signaling, the host's equipment can store and display information regarding the participants on the call. This allows the host to have visual confirmation that all of the participants have joined the conference. Further, if a participant drops from the conference, the MCU can inform the host of this event. The participant information sent to the host may also be sent to each participant via either voice announcement, out of band Q.931 ISDN messages, TCP/IP messages, or other suitable facilities. This allows each call participant to know the participants in the conference.

In step 546, the host signals the MCU 112 to either add the participant to the conference or deny access to the conference. The signaling from the host to the MCU may employ any suitable communication facility available to both. For example, the signaling could employ in-band DTMF signals generated by the host's analog telephone, equivalent ISDN signaling, voice-recognition of the host's spoken instructions, out of band Q.931 messages, or new TCP/IP messages generated by a telephone or a computer workstation. If in-band signaling or voice recognition are used, the interaction between the host and the MCU 112 may employ digit receiver or speech processing resources integrated into the MCU 112. Alternatively, the MCU may request these services from other network resources such as Service Node 160, if appropriate connections are available between MCU 112 and the rest of the network.

If, in step 546, the host signals the MCU 112 to deny access to the conference, the method jumps to step 548, in which the MCU 112 plays an announcement or otherwise informs the participant that the host has denied access to the conference. When a call is denied, MCU 112 may redirect the denied call to a voice mail system 166 if one is available and the host subscribes. If in step 546, the host signals the MCU 112 to join the participant to the conference, the method continues in step 550, in which the MCU adds the participant to the conference. The method ends at step 552.

The MCU 112 may simultaneously provide service to a plurality of conferences. Because participants in a CMCC conference always call the host's own telephone number to join the conference, the MCU 112 advantageously determines the particular conference to which a calling participant desires access by comparing the called number (provided by switch 116 when the call is transferred to the MCU) to host telephone numbers 312 (FIG. 3) stored in reservation records. This avoids the need for hosts to distribute, and participants to receive a special conference bridge telephone number or access code.

The above-described embodiment of the invention is merely one example of a way in which the invention may be carried out. Other ways may also be possible and are within the scope of the following claims defining the invention.

What is claimed is:

1. A multiple-party telephone conferencing system comprising:

conference bridge connected with a telecommunications network;

conference bridge reservation system that stores information defining a telephone conference call, said information including at least a host telephone number associated with a host of said conference call and a scheduled time for a telephone conference call, said host telephone number being the normal telephone directory number of the host;

switch that serves a host subscriber line having the host telephone number;

a services circuit point coupled to the switch;

called party busy trigger facility associated with the switch that launches a first query to said services control point for instructions regarding treatment to be applied to an incoming call made to the host telephone number when the host telephone is busy;

services circuit point generating a second query seeking said information stored in the conference bridge reservation system relating to the conference call associated with the host;

services circuit point determining if the incoming call to the host telephone number is being made during said scheduled time;

the services circuit point transmitting a message to the switch instructing the switch to redirect the incoming call for the host to said conference bridge upon the services circuit point determining that the incoming call to the host telephone number is being made during said scheduled time; and said conference bridge being responsive to said redirected call from said host telephone number to join said redirected call to said conference call.

2. A method for establishing a multiple-party telephone conference call for a host supported by a switch comprising the steps of:

storing information defining a telephone conference call in a conference bridge reservation system, said information including at least a host telephone number associated with a host of said conference call and a scheduled time for a telephone conference call, said host telephone number being the normal telephone directory number of the host;

receiving at the switch an incoming call to the host telephone number;

determining that the host telephone line is busy;

using a called party busy trigger facility associated with the switch to launch a first query to a services control point for instructions regarding treatment to be applied to the incoming call to the busy host telephone number;

generating a second query from the services circuit point seeking said information stored in the conference bridge reservation system relating to the conference call associated with the host;

determining by the services circuit point if the incoming call to the host telephone number is being made during said scheduled time;

transmitting from the services circuit point a message to the switch instructing the switch to redirect the incoming call for the host to said conference bridge upon the services circuit point determining that the incoming call to the host telephone number is being made during said scheduled time;

redirecting, by the switch, the incoming call to the conference bridge; and the conference bridge responding to said redirected call from said host telephone number and joining said redirected call to said conference call.

* * * * *